United States Patent
Lennon

[15] 3,700,294
[45] Oct. 24, 1972

[54] SHAFT SUPPORT AND SEAL
[72] Inventor: John J. Lennon, Winchester, Mass.
[73] Assignee: Nettco Corporation, Everett, Mass.
[22] Filed: April 21, 1971
[21] Appl. No.: 135,846

[52] U.S. Cl..............308/36.1, 259/108, 259/DIG. 16
[51] Int. Cl...............................................F16c 33/74
[58] Field of Search....308/187.1, 36.1; 259/DIG. 16, 259/107, 108

[56] References Cited

UNITED STATES PATENTS

| 3,606,260 | 9/1971 | Rubin | 308/36.1 |
| 3,443,794 | 5/1969 | Peterson | 259/107 |
| 3,115,333 | 12/1963 | Lennon | 259/108 |
| 2,830,801 | 4/1958 | Stratienko et al. | 259/108 |

FOREIGN PATENTS OR APPLICATIONS 703,636   2/1965   Canada...............259/DIG. 16

Primary Examiner—Edgar W. Geoghegan
Assistant Examiner—Barry Grossman
Attorney—Cesari and McKenna

[57] ABSTRACT

The inventions relates to a drive unit for rotating a shaft that extends into an enclosure and is sealed thereto by a conventional rotary seal. The shaft is supported by a bearing disposed a short distance from the seal so that oscillatory or pendulum-like movement of the shaft about the bearing as a center of rotation results in minimal radial displacement of the seal. The shaft is fabricated in two mating sections, an outer one connected to the supporting bearing and the inner one carrying the rotary seal. The inner shaft section can be axially displaced to separate the two sections for replacement of the seal without disturbing the bearing or other parts of the drive unit.

5 Claims, 1 Drawing Figure

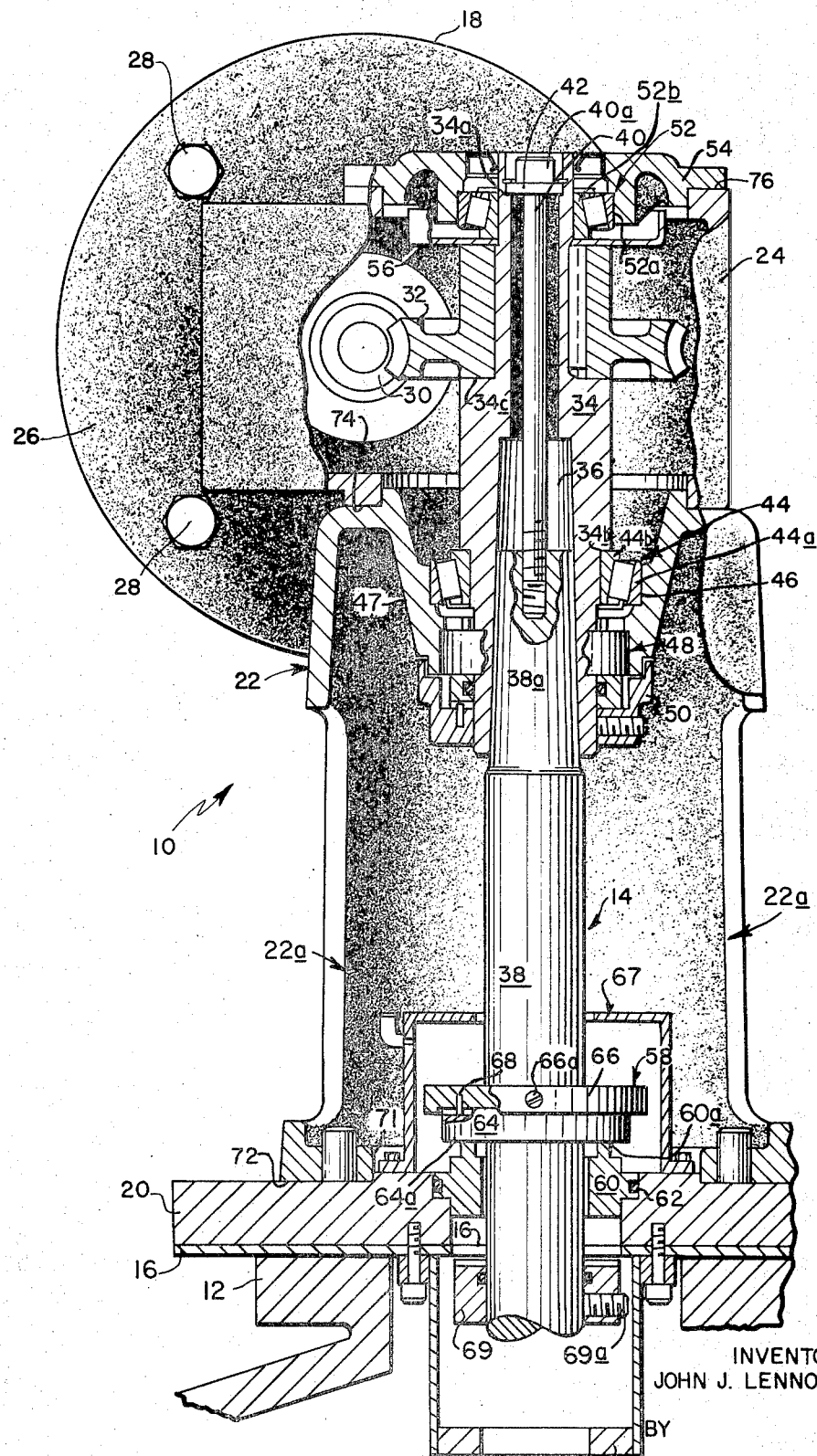

SHAFT SUPPORT AND SEAL

BACKGROUND OF THE INVENTION

1. Field of the Invention

This invention relates to a drive unit of the type used to rotate an object within a sealed enclosure such as a tank. More specifically, it relates to a drive unit having a shaft extending into a tank and provided with a rotary seal to prevent ingress or escape of fluids along the shaft. Drive units of this type are often used in mixers which employ rotating impellers or paddles to agitate liquids within tanks. These rotating members are generally driven from external motors by means of shafts extending into the tanks. The tanks often must be sealed to prevent ingress of contaminants or escape of noxious substances and the present invention concerns the seal used between such a shaft and the tank wall through which it projects.

2. Prior Art

Seals of various kinds have been used for this purpose, but the most effective is the conventional sliding-contact rotary seal. A seal of this type has a pair of annular members in sliding contact with each other along opposing, radially extending annular faces. One of these members is sealed to the shaft to rotate therewith. The other member, which is stationary, is sealed to a housing, so that rotation of the shaft causes the two faces to undergo a relative sliding movement. Thus, the actual seal between the shaft and housing is provided by the two opposing faces, which are carefully machined and spring loaded toward each other to provide as tight a seal as possible.

A system of this type has two important attributes that bear on the present invention. The first of these is the fact that rotary seals are subject to wear and must eventually be replaced. Moreover, since they are annular, they must be removed and installed over the end of the shaft. Therefore, one must provide for unobstructed relative movement between the operating position of the seal and a shaft end if the system is to be properly serviced in the field.

The second factor is the position of the shaft-supporting bearings. They are out of necessity located outwardly of the shaft seal, since they must be isolated from the interior of the tank. This can mean removal of the bearings and other parts, or some other time-consuming operation, in order to provide access to the shaft seal by way of the shaft end.

Alternatively, it has been proposed that the shaft be made in two parts coupled together by a coupling disposed between the seal and the bearing. Then to replace the seal, one would disengage the coupling and axially displace the seal-carrying shaft member so as to provide access to the outer end thereof.

This latter arrangement eliminates the necessity of removing bearings and other drive members. However, the shaft seal is subject to undue wear and it, therefore, has such a short life that this arrangement is not so effective as it ought to be in practice. The short seal life is due largely to the relatively great distance between the shaft-supporting bearing and the seal. In operation, the shaft is subjected to forces that impart to it a pendulum-like motion which is centered on the shaft-supporting bearing, i.e., the bearing which is closest to the operating end of the shaft. This motion, which is largely imperceptible to the eye, is in fact fairly substantial and the total excursion of the shaft is proportional the distance from the center of rotation. With the coupled shaft arrangement described above, accommodation of the coupling requires that the bearing be located a fairly substantial distance from the shaft seal. The lateral shaft movement at the seal is, therefore, great enough to materially reduce the life of the rotary seal.

For this reason an extra bearing is often installed next to the seal to limit shaft excursion at that point. However, this increases the cost of the drive unit. Also it makes seal replacement more time consuming, because the bearing must be displaced in the process.

Additionally, shaft eccentricity due to the coupling has a substantial deleterious effect on seal life.

SUMMARY OF THE INVENTION

I have devised a drive unit with the main shaft bearing located relatively close to the rotary seal, but without a conventional shaft coupling in between. Instead I interfit the ends of the two shaft sections to provide the coupling function. In a preferred embodiment of the invention, this is accomplished by means of a socket-like upper shaft section that rotates within the bearing and is rotated by the drive motor. A lower shaft section to which the rotary seal is affixed has an upper end that fits into the socket to be supported thereby and rotate therewith during operation of the drive unit. When the shaft seal is to be replaced, the lower shaft member is dropped from the socket in a manner to be described to make its upper end accessible for removal of the worn seal and installation of a new one.

The invention thus provides very ready access to the upper end of the lower shaft section while maintaining a relatively short distance between the bearing and the rotary seal.

Another important factor in rotary seal life is the maintenance of concentricity between the seal and the shaft bearings. In terms of the structure of the drive unit, this means that the bearing seats and the seat for the stationary part of the rotary seal should be as concentric as practicable. This, in turn, means that there should be a minimum of intervening mating surfaces between the various seats so as to prevent undue eccentricity from tolerance accumulation. This is a further feature of the drive unit described below.

THE DRAWING

The drawing is a side view, partly broken away and partly in vertical section, of a drive unit incorporating the invention.

DETAILED DESCRIPTION OF THE INVENTION

Referring now to the drawing, a drive unit generally indicated at 10 is mounted onto the top wall 12 of a tank, with a shaft 14 projecting downwardly into the tank through an aperture 16 in the wall 12. The shaft 14 carries suitable mixing gear (not shown) or other equipment for rotation within the tank, the rotary power being supplied by a motor 18 at the upper end of the drive unit 10.

The drive unit 10 includes a base plate 20 suitably secured to the tank wall 12 and supporting a generally cylindrical stand generally indicated at 22. The stand 22, in turn, supports a gear box 24 that has an integral mounting plate 26 on which the motor 18 is supported by bolts 28. The motor 18 drives the shaft 14 by way of a worm 30 that meshes with a worm gear 32 keyed to a socket shaft section 34 that serves as the upper end of the shaft 14.

The shaft section 34 is provided with a tapered socket 36 that snugly accommodates the tapered upper end 38a of a lower shaft section 38. The tapered end 38a is drawn upwardly into the socket 36 by means of a bolt 40 extending down through a central space in the shaft section 34 and threaded into the shaft end 38a. When turned down to draw the shaft end 38a into the socket 36, the bolt head 40a works against a washer 42 that is seated against a shoulder 34a in the counter-bored upper end of the shaft section 34.

Vertical support for the shaft 14 is provided in part by a thrust bearing 44 whose outer race 44a fits within a seat 46 machined into the inner surface of a reentrant well 47 extending down from the top of the stand 22. The bearing's inner race 44b takes the vertical thrust from the shaft by way of a shoulder 34b.

The gear box 24 is filled with a suitable lubricant which also permeates the bearing 44. A conventional rotary seal 48, supported underneath by a cup 50 attached to the upper shaft section 34, prevents downward leakage of the lubricant.

At the upper end of the shaft section 34, a second thrust bearing 52 rotatably supports the shaft against upwardly acting forces. The outer race 52a of this bearing is seated in a cover plate 54 secured in the top of the gear box 24, while the inner race 52b bears downwardly against a shaft shoulder 34c by way of the worm gear 32 and an intervening cup 56. The cup 56 contains lubricant for the bearing 52.

Still referring to the drawing, a seal between the shaft 14 and the tank wall 12 is provided by a rotary seal generally indicated at 58. The seal 58 includes a stationary lower ring 60 resting on a shoulder 62 in a counter-bore in the base plate 20. The ring 60 is provided with an O-ring seal to the base plate. A rotating ring 64 bears against a retainer 66 that is secured to the lower shaft section 38 for rotation therewith. The ring 64, which is O-ring sealed to the shaft section 38, is made to rotate with the shaft and retainer 66 by means of an intervening pin 68. The rotating ring 64 is spring-loaded to force its lower face 64a against the upper face 60a of the stationary ring 60 and the rotary sliding fit between these two faces provides the requisite seal between the shaft and the tank wall 12. A lubricant dam 67 maintains a reservoir of lubricant for the seal 58.

When the seal 58 is to be replaced, the set screw 66a holding the retainer 66 in place is loosened and the bolt 40 is then unscrewed and lightly tapped to release the tapered shaft end 38a from the socket 36. The lower shaft section 38 is then lowered to bring its upper end below the bottom of the shaft section 34. The various parts of the seal 58 can then be removed over the end of the shaft section 38 with access for this purpose being provided by large apertures 22a in the stand 22. The mechanic can then drop the parts of the replacement seal down over the shaft end 38a, then reinsert the lower shaft section into the socket 36 and fasten the section 38 in place by means of the bolt 40. Finally, with the various parts of the seal 58 correctly positioned, he locks the retainer 66 in place by means of the set screw 66a.

To assist in retaining the upper end of the shaft section 38 within reach for reinsertion into the socket 36, one may include the illustrated arrangement for limiting downward displacement of the section 38 during seal replacement. A collar 69, disposed below the seal 58, is fastened to the shaft section 38 by a set screw 69a. When the shaft is lowered it descends until the collar 69 bottoms on an annular bracket 70, bolted to the base plate 20 and this limits further travel. This is particularly important in a large tank where the lower shaft section might be difficult to retrieve if allowed to descend to the bottom of the tank. It is also a desirable feature in any case where damage might result from contact between the components at the lower end of the shaft section and the bottom of the tank.

One will readily appreciate the ease with which the shaft seal 58 can be replaced. Moreover, with this arrangement, the bearing 44 can be located close to the seal 58. For example, in a typical installation, a shaft driven by a five horsepower motor may extend ten feet into a tank, with a distance of only three inches between the bearing 44 and the seal 58. With this combination of power and shaft length, the shaft is subjected to a very considerable oscillatory motion. As will be apparent from the drawing, the bearing 44 is the pivot for this pendulum-like motion. However, while this component of motion may be characterized by a very considerable amplitude at the lower end of the shaft 14, the sideways shaft excursion at the seal 58 is minimal because of the close proximity of the seal 58 to the bearing 44. As pointed out above, this minimizes wear of the seal.

Another factor affecting seal wear is the degree of concentricity between the seal 58 and the bearings 44 and 52. The illustrated construction facilitates the attainment of concentricity, both by including a relatively small number of mating surfaces and from the ease with which these surfaces are properly machined. Thus, the seat 46 for the bearing 44 should be concentric with the inner annular surface 71 at the lower end of the stand 22 and perpendicular to the bottom surface 72 of the stand. The corresponding surfaces on the base plate 20 should be concentric with and perpendicular to the seat 62 for the stationary seal ring 60. The proper relationship between the various surfaces of the stand 22 can be readily maintained as can the relationship between the surfaces 62, 71 and 72 of the base plate 20, thus leaving the fit between the stand and base plate as the most significant factor in deviation from the ideal concentric relationship.

Similarly, the concentricity of the bearing 52 with respect to the bearing 44 is governed by the proper positioning and orientation of the surfaces at 74 between the gear box 24 and the stand 22, at 76 between the cover plate 54 and gear box 24 and the seat of the outer bearing race 52a. Since the surfaces on each of these latter parts are readily positioned and oriented with respect to each other within close tolerances, the most significant factors in departure from concentricity are the surfaces at 74 and 76. Thus, there are relatively few places in the entire assembly where extra care must be taken in order to keep the bearings and the seal 58 concentric within the desired tolerance.

It should also be noted that with the tapered fit between the lower shaft section 38 and the socket shaft section 34, the concentricity of the two shaft sections is a rather simple matter as compared with the problems encountered when conventional shaft couplings are used.

Accordingly, one will readily appreciate that the drive unit combines long seal life with ready replacement of worn seals. Yet, it is all characterized by relative ease of manufacture, all of which attributes contribute to a marked improvement over prior drive units used to impart rotary motion through sealed enclosures.

I Claim:

1. A drive unit for applying rotary motion to an object disposed within an enclosure, said drive unit comprising
   A. a support;
   B. a shaft thrust or drive bearing mounted on the support;
   C. a first shaft section having an end portion thereof journaled in the bearing;
   D. a second shaft section
      1. for connection to the object in the enclosure, and
      2. having an end portion extending out of the enclosure toward the first shaft section;
   E. a rotary seal connected to effect a seal between the second shaft section and the enclosure, and
   F. the opposing ends of the first and second shaft sections being shaped to interfit with one another so that the bearings overhangs the second shaft section in order to
      1. minimize the distance between the shaft bearing and the seal, thereby minimizing shaft runout at the seal when the drive unit is operating, and
      2. to provide clearance for the removal of the seal for maintenance purposes.

2. The drive unit defined in claim 1 in which:
   A. the interfitting end of one of said shaft sections is tapered, and
   B. the interfitting end of the other shaft section has a socket-like recess accommodating the taper.

3. The drive unit defined in claim 2 in which:
   A. said recess is in said first shaft section, and
   B. said tapered end is on said second shaft section.

4. The drive unit defined in claim 3:
   A. in which said first shaft section includes an axial bore extending from said socket to the other end of said first section,
   B. including a bolt:
      1. extending through said bore and threaded into the tapered end of said second shaft section, and
      2. having a head that works against a surface of said first shaft section to draw said tapered end into said recess.

5. The drive unit defined in claim 1 and further including a plurality of guide surfaces on the support for maintaining a high degree of concentricity between the seal and bearing.

* * * * *